July 22, 1958
A. J. HILGERT
2,844,768
ELECTROMAGNETIC OPERATOR
Filed March 16, 1953
2 Sheets-Sheet 1
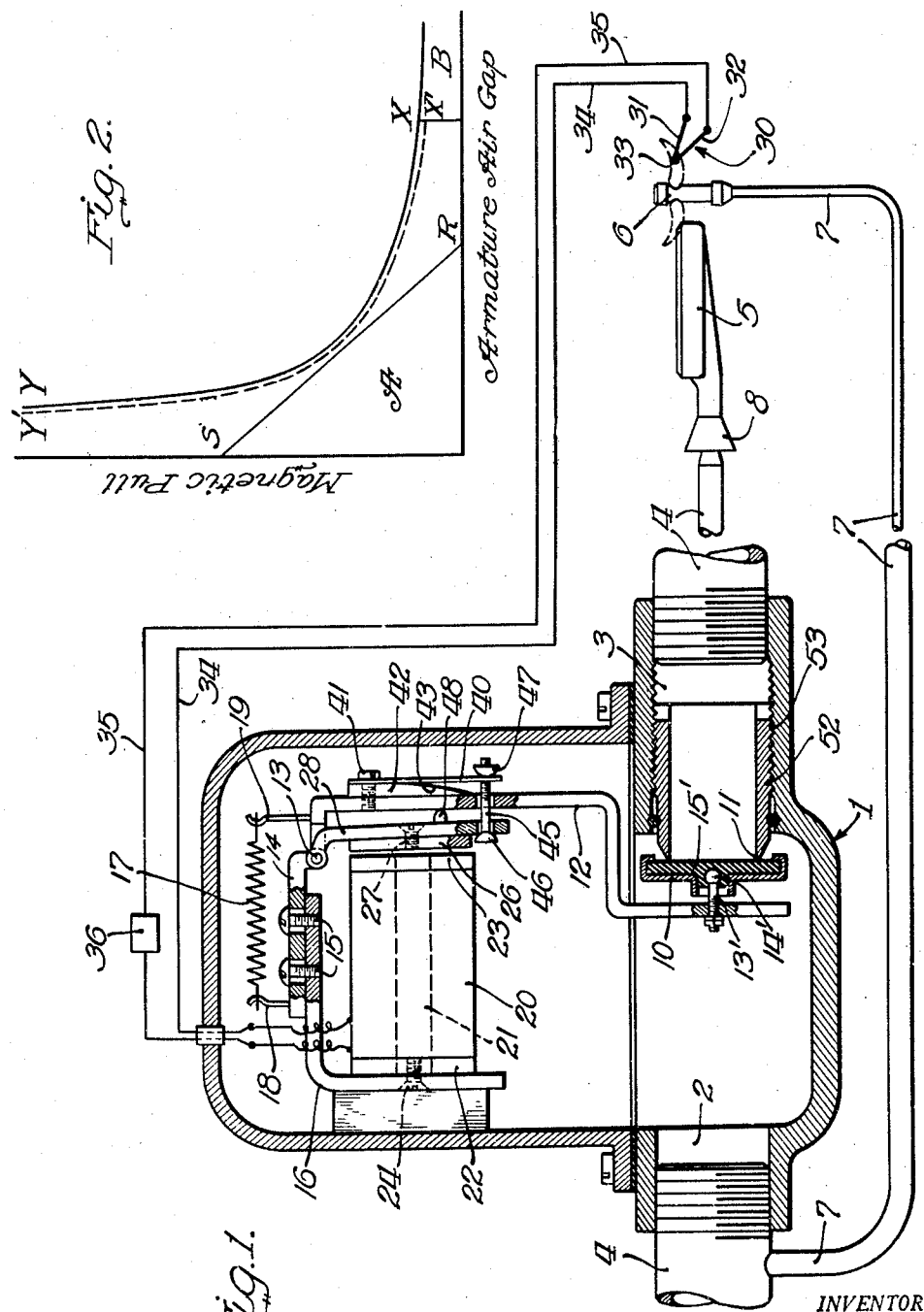
INVENTOR.
Adolph J. Hilgert
BY Power Input INVENTOR.
Adolph J. Hilgert

United States Patent Office 2,844,768
Patented July 22, 1958

2,844,768

ELECTROMAGNETIC OPERATOR

Adolph J. Hilgert, Milwaukee, Wis., assignor to Baso Inc., a corporation of Wisconsin Application March 16, 1953, Serial No. 342,536

16 Claims. (Cl. 317—198)

This invention relates, in general, to control devices, and more particularly to an electromagnetic operator which has particular utility in the operation of valves, electric relays or switches or the like.

While I have shown and shall describe herein electromagnetic operators according to the present invention as applied for operating a valve for controlling, for example, the flow of fuel for fluid fuel burning apparatus; also as applied for operating an electric relay, and as powered by a source of small electric energy such as a single thermocouple or a thermopile or the like, it is to be understood that the invention is not, in its broader aspects, limited to such use, or to being so powered, but may be employed for other purposes and be otherwise powered as suitable or desired.

In apparatus of the aforementioned character, certain basic considerations must be kept in mind. In application of the operator to a valve which in closed position is sealed against its valve seat a given amount of work must be done to open the valve. A large initial or starting force is required for overcoming the inertia and friction of the moving parts and for overcoming, for example, fluid pressures in "cracking" or opening a valve wherein the controlled fluid, such as gas for a gas burner, usually tends to hold the valve closed. Similarly, where the operator is applied to an electric relay or an electric switch or the like high contact pressure is advantageous and, in fact, may be desirable where, for example, it is a requirement that the device be shock or vibration proof or capable of being subjected to high gravity values, and where snap action or quick-make and quick-break at the contacts is desired.

On the other hand, where an electromagnet and a cooperating armature are employed, the magnetic pull or attraction of the electromagnet for the armature is less when the armature is fully retracted with the armature air gap at its maximum and increases as the air gap between the electromagnet and the armature is reduced upon movement of the armature to attracted position.

Moreover, in apparatus powered by a source of small electric energy such as a single thermocouple or a thermopile or the like, the power or electric energy is very limited (the output of a thermocouple presently marketed by Baso Inc., assignee of the present invention, being under ordinary circumstances of the order of 5.5 milliwatts or about 20 millivolts to a matched load).

With these considerations in mind, it is an object of the present invention to provide an electromagnetic operator having increased efficiency for use as an actuator for a valve or an electric relay or elsewhere as desired. The increased efficiency of the operator of this character has particular utility when thermocouple powered because of the small amount of power or electric energy available but the invention also has utility elsewhere, for example, in line powered devices. In the latter case, an obvious advantage would be the ability to build a much smaller unit to do the work of a larger but less efficient unit.

Another object is to provide an improved and more efficient electromagnetic operator which will provide the large initial or starting force for starting operation of the valve movement or movement of the relay contact or the like notwithstanding the relatively small magnetic pull or attraction of the electromagnet for its armature when the armature is fully retracted and with the air gap at a maximum.

Another object is to provide an electromagnetic operator having energy storing means operatively associated with the armature in which energy is stored by movement of the armature to attracted position—the energy storing means having, under the energy storing action of the armature, an energy storing rate which follows the relationship between the magnetic attraction of the electromagnet for the armature and the armature air gap, and wherein the stored energy becomes effective to perform the desired work when the armature air gap is reduced to a value approaching that which affords maximum magnetic attraction of the electromagnet for the armature.

Another object is to provide an electromagnetic operator of the aforementioned character wherein not only does the energy storing means have an energy storing rate which follows the relationship between the magnetic attraction of the electromagnet for the armature and the armature air gap, but wherein said energy storing rate is less than the aforesaid relationship throughout the storing of energy in the energy storing means.

Another object is to provide an operator of the aforementioned character wherein said energy storing means is in the form of a cumulator spring which, as energy is stored therein by movement of the armature from its retracted position to its attracted position, has its effective length shortened and its stiffness increased to change the spring rate so that it follows the pull curve of the electromagnet.

Another object is to provide a device wherein the effective length of the cumulator spring is shortened and its stiffness increased by "rolling" or "folding" the spring against a cam or by using a curved spring and "rolling" it against an operatively associated arm in movement of the armature from its retracted position to its attracted position.

Another object is to provide an adjustable valve seat for bringing the armature into proper position so that the energy storing rate of the energy storing means will be less than the relationship between the magnetic attraction of the power unit for the armature and the armature air gap.

Another object is to provide an operator which, for example, when line powered is capable of applying exceedingly high forces, for example, exceedingly high sealing force on a valve or exceedingly high contact pressure in a relay.

Further objects and advantages and numerous adaptations of the invention will appear from the following detailed description taken in connection with the accompanying drawings, it being understood that the invention is limited only within the scope of the appended claims and not to the particular embodiment selected for illustration.

In the drawings:

Figure 1 is a sectional view through a valve body showing an electromagnetic operator embodying the present invention applied for opening a valve which is illustrated more or less diagrammatically as controlling the flow of fuel to a fluid fuel burner provided with a pilot burner and wherein there is a thermoelectric generator subject to the heat of the pilot burner for energizing the electromagnetic operator;

Figure 2 is a graphic representation showing how the spring rate of the energy storing means substantially follows the relationship between the magnetic attraction of the power unit for the armature and the armature air gap;

Figure 3:
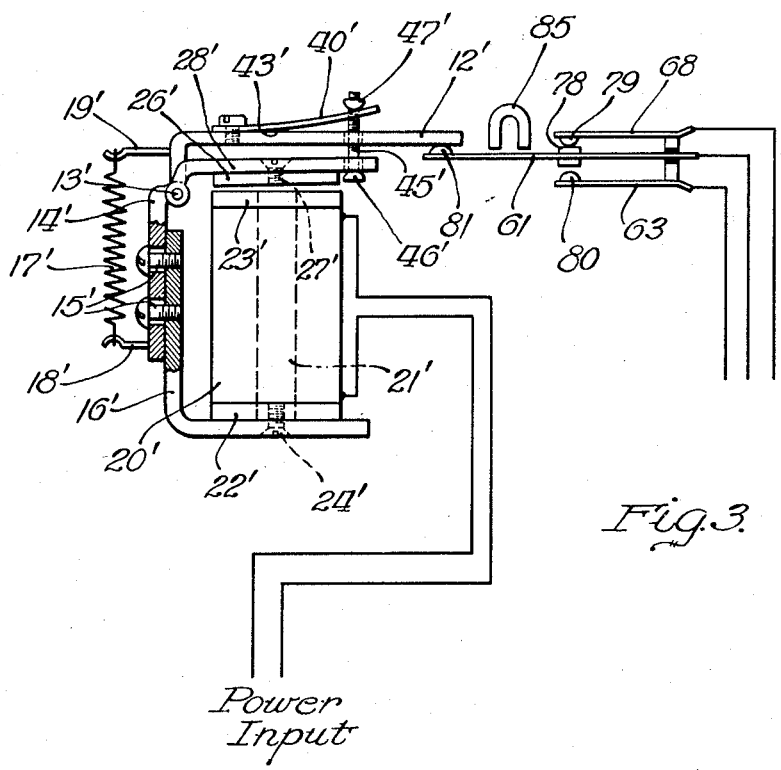
Figure 3 is a sectional view of another electromagnetic operator embodying the present invention as applied for operating an electric relay.

In the embodiment of the invention illustrated in Figure 1, the numeral 1 indicates a main valve body having a gaseous fuel inlet 2 and a gaseous fuel outlet 3. Contiguous sections of gaseous fuel supply pipe 4 are connected to the inlet 2 and outlet 3. The section connected to the outlet 3 leads, for example, to a main burner 5 which may be located in the firebox of a heater or fuel burning apparatus. A pilot burner 6 is located in juxtaposition to the main burner 5 to maintain a pilot flame for igniting the main burner. The pilot burner 6 may be supplied with gaseous fuel by a pilot fuel supply pipe 7 which where 100% shut-off is not required may be connected, for example, as shown to the pipe 4 interior or upstream of the valve controlled fuel outlet 3. If 100% shut-off is desired, the pilot fuel supply pipe 7 may be provided with a thermoelectric safety shut-off device as shown, for example, in the copending application of Gerald E. Dietz, Serial No. 296,831, filed July 2, 1952. The positions of the pilot burner and main burner flames are shown in dotted lines.

The delivery of gaseous fuel from the pipe 4 to the burner 5 is preferably by way of a mixing chamber 8 to which air is admitted through adjustable air inlets (not shown) as well understood in the art.

A main valve 10 cooperates with a valve seat 11 at the inner end of the outlet 3 to control the flow of fuel to the main burner 5. The valve 10 is attached to and carried by a valve arm 12 preferably by an attachment 13' and a ball member 14' preferably affords rocking movement of the valve 10 for self-alignment with the valve seat 11, in general, in accordance with the teachings of applicant's copending application Serial No. 424,854, filed April 20, 1954, as a continuation of applicant's application Serial No. 194,507, filed November 7, 1950, now abandoned. The valve 10 is preferably provided with a facing 15' of rubber or other resilient material ground to a flat surface for presentation to the valve seat 11. This provides a better seal with less sealing force thereby permitting the power unit to do more useful work in opening valve 10.

The valve arm 12 is pivoted on a pin 13 carried by a hinge arm 14 adjustably secured, for example, by screws 15 to the adjacent leg of an angular bracket 16. A coiled spring 17 connected between a lug 18 on the hinge arm 14 and a lug 19 on the valve arm 12 serves to bias the valve 10 to closed position and, in conjunction with the pressure of the fluid flowing into the valve body, provides the necessary sealing force to prevent leakage of the valve. The spring 17 also provides force for overcoming residual magnetism of the electromagnetic operator upon deenergization thereof for retraction of the armature and closure of the valve 10. It will at once become apparent that the force exerted by the spring 17 on the one hand must not be greater than the power available from the operator when the armature is being attracted or the valve cannot be opened; while, on the other hand, the force of the spring 17 must be great enough to overcome residual magnetism of the operator upon deenergization thereof for closure of the valve, and great enough to provide the necessary sealing force to the valve 10 when in closed position.

The low power electromagnetic operator comprises a coil 20 wound around a pair of core pieces one of which is shown at 21 and between a pole piece 22 common to both core pieces 21 at one end and a pair of pole pieces one of which is shown at 23 at the opposite ends of the core pieces 21. The operator may be attached to the bracket 16, for example, by securing the pole piece 22 to the adjacent leg of the bracket 16 by a screw 24. The structure of the power unit of the electromagnetic operator particularly in respect of the pole pieces, core pieces, movable armature, coil and thermocouple connected in circuit with the coil may be of the form more fully illustrated and described in the copending application of Donley S. Collins, Gerald E. Dietz, and Adolph J. Hilgert, Serial No. 249,778, filed October 4, 1951, now Patent No. 2,790,937, which makes very efficient utilization of available power. Suffice it for purposes of the present application to state that the core preferably has enlarged pole pieces provided with coaxial opening; that the core pieces preferably have their opposite ends expanded into the openings and thereafter heat treated to deform and join the grains of metal so that the pole pieces and core pieces are in substantially one piece; that the coil is wound around the core pieces and between the pole pieces; that the movable armature is preferably at least equal in area to the pole faces of adjacent pole pieces; and that the thermocouple to be presently described is connected in circuit with the coil.

The armature 26 is attached, for example, by a screw 27 to an armature arm 28 which is pivoted on the same pivot pin 13 on which the valve arm 12 is pivoted. Where, for example, relay steel or the like is used as the core pieces and pole pieces of the operator and as the armature, the addition of a push-off spring and/or spacer for maintaining minimum air gap as disclosed in the copending application of Gerald E. Dietz and Adolph J. Hilgert, Serial No. 292,488, filed June 9, 1952, is contemplated. However, where, for example, 4750 steel (affording negligible residual magnetism) is utilized, such push-off spring and/or spacer are unnecessary and therefore have not been shown in the present application.

The electromagnetic operator is shown as powered by a single thermocouple 30 heated, for example, by the flame of the pilot burner 6, although a thermopile or other source of small or, if desired, greater electric energy may be employed. The thermocouple 30 comprises dissimilar thermocouple elements 31 and 32 joined at 33 to form a "hot" junction which is heated by the pilot burner flame. The thermocouple elements are connected in circuit with the coil 20 of the operator, for example, by lead conductors 34 and 35 for energization of the coil 20 by the thermocouple when its "hot" junction is heated by the pilot burner flame. The thermocouple circuit may be under the control of a thermostat or other condition responsive means shown diagrammatically at 36.

The energy storing means comprises a cumulator spring in the form of a normally flat leaf spring 40 attached to the valve arm 12, for example, by a screw 41 with a cam member 42 interposed between the arm 12 and the spring 40 and secured in place by the screw 41. The cam member 42 has a cam surface 43 presented toward the spring 40 and against which the spring 40 is "rolled" or "folded" by the movement of the armature 26 to attracted position as will presently appear. As the armature 26 moves toward its attracted position, its motion is transmitted to the cumulator spring 40 through a swivel link 45. The link 45 extends loosely through openings in armature arm 28, valve arm 12 and spring 40 and has at one end a head 46 operatively cooperating with the armature arm 28. Screwed upon the opposite end of the link 45 is an adjusting nut 47 which operatively cooperates with the spring 40. The adjusting nut 47 is used to load the cumulator spring 40 slightly when the armature arm 28 and valve arm 12 are in contact or in operative cooperation through a spacer 48 interposed between these arms.

Assuming the thermocouple 30 is generating electricity for supply to the valve operator through the conductors 34 and 35, the coil 20 will be energized and the armature 26 attracted to the pole pieces 23 with accompanying clockwise movement of the armature arm 28 about the pivot 13 as the device is shown in Figure 1. Initial movement of the armature and the force resulting therefrom is applied to valve arm 12 through link 45 and spring 40. However, such initial force is so small as to be incapable of moving arm 12 against the biasing force exerted thereon by spring 17 and the fluid pressure against valve 10, wherefore such force causes spring 40 to be "rolled" or "folded" against the cam surface 43 of cam member 42. In this manner, energy is stored in spring 40, and upon further movement of armature 26 without resultant movement of valve arm 12, additional energy is stored in spring 40. Thus, an additional increment of energy is stored in spring 40 with each additional increment of movement of armature 26 without corresponding movement of arm 12, wherefore spring 40 is said to accumulate energy throughout such movement of armature 26 with respect to valve arm 12. As the motion of the armature to attracted position is transmitted to the spring 40 through the link 45, its effective length becomes shorter and its stiffness and spring rate are increased. That is, the spring rate, which is the amount of force required to effect a predetermined amount of deflection, increases with increase in deflection thereof because as the effective length of spring 40 becomes shorter and the stiffness greater, more force is required to cause spring 40 to deflect a given amount than was required to cause the same amount of deflection when spring 40 was not deflected as much. As a result, the amount of energy that is stored in the spring 40 within a given amount of movement is increased.

Only when the armature travel has reduced the air gap between the pole pieces 23 and the armature 26 to a point affording greater available magnetic pull or attraction for the armature and at a point at which such pull and the force or energy stored in the spring 40 is sufficient to overcome the sealing force of the valve 10 is the latter put into action and pulled away from the valve seat 11 with a snap, the energy stored in the flexible spring 40 being released.

The increase in the efficiency of the operator aforedescribed may best be explained by reference to Figure 2 wherein the curve XY represents the relationship between magnetic pull of the power unit and armature air gap. The spring 40 of the present invention has a spring rate or an energy storing rate which follows the curve XY. It is not practical to have the rate curve of the cumulator spring fall directly on the curve XY but instead the rate curve of the spring preferably falls somewhat below the curve XY, for example, on the curve X'Y'. This assures that the magnetic pull always exceeds the pull of the cumulator spring. This is an essential condition because once the armature starts its movement to attracted position it will complete it without having to increase the coil current. With a linear spring with a rate shown, for example, by the straight line RS in Figure 2, the amount of work which can be done is less since the area below RS is less than the area below the curve X'Y'.

It can be seen in Figure 2 at point X' that the cumulator spring can have an initial load. It is not practical to go beyond X into area B since the cumulator spring would become too weak and unstable. The hinging or pivoting of both the valve arm 12 and armature arm 28 on the same pivot pin 13 enables ready adjustment and clamping so as to bring the armature and magnet poles into alignment.

Another novel feature of the invention resides in the provision of a valve seat 11 which is adjustable to bring the armature into proper position so that the curve X'Y' lies below the curve XY, for example, as shown in the drawings. For this purpose, the valve seat 11 is formed at the inner end of a tubular valve seat member 52 threaded at 53 to be screwed to the desired position in the outlet 3 the external threads on the member 52 having threaded engagement with internal threads in the outlet 3.

If at any time the flame of the pilot burner 6, which normally should burn constantly, becomes extinguished, thereby creating an unsafe condition, the thermocouple 30 will be deenergized and the flow of energizing thermoelectric current in the electromagnetic operator will be discontinued. When this occurs the valve 10 moves to closed position against the seat 11 under the bias of the spring 17. The spring 17 in conjunction with the pressure of the fluid flowing through the valve body provides the necessary sealing force to prevent leakage of the valve.

Referring now to Figure 3 the contact 78 is carried by the contact spring 61 and is biased by this spring into contact with the contact 79 carried by the contact spring 68. The contact 78 is actuated out of contact with the contact 79 and into contact with a contact 80 carried by the contact spring 63 by the arm 12' of the electromagnetic operator. This pivoted arm 12' corresponds with the valve arm 12 of the preceding embodiment of the invention except that by operative cooperation at 81 with a projecting end of the spring 61 it actuates the contact 78 as previously set forth.

The electromagnetic operator of this embodiment of the invention and its energy storing means are similar to the operator and energy storing means shown in Figure 1 except that the cumulator spring 40' is a normally curved leaf spring and cooperates with the flat surface 43' of the arm 12' presented thereto. As before, initial movement of the armature and the force resulting therefrom is not immediately applied to the contact spring 61 but rather is stored in the cumulator spring 40' and as the motion of the armature 26' to attracted position is transmitted to the spring 40' through the link 45' the spring 40' is "flattened" against the flat surface 43' so that its effective length becomes shorter and its stiffness increases. Therefore, as before, the spring rate is changed so that it follows the pull curve of the electromagnet.

Also as in the preceding embodiment of the invention, only when the armature travel has reduced the air gap between the pole pieces 23' and the armature 26' to a point affording greater available magnetic pull or attraction for the armature and at a point at which such pull and the force or energy stored in the spring 40' is sufficient to overcome the force of the contact 78 against the contact 79 is the contact 78 actuated out of contact with the contact 79 and into contact with the contact 80.

Figure 4:
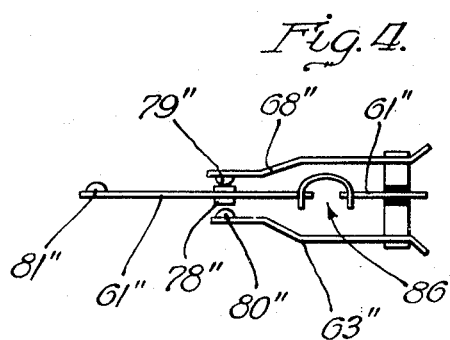
Figure 4 is a fragmentary detail view showing mechanical snap means for a contact spring actuated by an operator embodying the present invention.

A permanent magnet 85 or other suitable mechanical snap means may be employed to obtain high normally closed contact pressure of the contact 78 against the contact 79 which the high force developed by the power unit or operator of the present invention will overcome. Moreover, the curved leaf spring 40' still has stored force to provide contact pressure on the "down" contact 80 when the armature 26' is in attracted position. Figure 4 shows more or less diagrammatically at 86 a mechanical snap device in the contact spring 61" for providing high normally closed contact pressure between the contact 78" and the contact 79".

The embodiments of the invention shown in the drawings are for illustrative purposes only and it is to be expressly understood that said drawings and the accompanying specification are not to be construed as a definition of the limits or scope of the invention, reference being had to the appended claims for that purpose.

I claim:

1. In apparatus of the class described, in combination, a power unit for energization from a source of electric energy, an armature having a retracted position separated from said power unit by an air gap, said power unit, when energized, exerting magnetic attraction for actuating said armature to attracted position, a work performing member, and energy storing force transmitting connection means operatively interposed between said armature and said member for storing energy therein during predetermined movement of said armature toward attracted position, said energy storing means having, under the energy storing action of said armature, an energy storing rate which substantially follows the relationship between the magnetic attraction of said power unit for said armature and the armature air gap, the energy stored in said energy storing means becoming effective following said predetermined movement of said armature to cause said member to perform work when the air gap of said armature is reduced to a value approaching that which affords maximum magnetic attraction of said power unit for said armature.

2. Apparatus according to claim 1 wherein the rate at which energy is stored in said energy storing means by movement of said armature to attracted position is less than the relationship between the magnetic attraction of said power unit for said armature and the armature air gap throughout the storing of energy in said energy storing means.

3. In apparatus of the class described, in combination, a work performing member movable from a first position toward a second position to perform work, an electromagnet and an armature therefor having a retracted position and an attracted position, and energy storing means operatively associated with said member and reacting in a direction for moving it from its said first position to its said second position, said energy storing means being operatively associated with said armature for storing energy by movement of said armature toward attracted position and having, under the energy storing action of said armature thereon, an energy storing rate which substantially follows the relationship between the magnetic attraction of said electromagnet for said armature and the armature air gap, the energy stored in said energy storing means by movement of said armature toward its said attracted position becoming effective for moving said work performing member from its said first position when said armature approaches the position of maximum magnetic attraction.

4. In apparatus of the class described, in combination, a work performing member movable from a first position toward a second position to perform work, an electromagnet and an armature therefor having a retracted position and an attracted position, and energy storing means comprising a cumulator spring operatively associated with said member and reacting in a direction for moving it from its said first position to its said second position, said cumulator spring being operatively associated with said armature so as to be loaded by movement of said armature toward attracted position and having, under the storing action of said armature thereon, a loading rate which substantially follows the relationship between the magnetic attraction of said electromagnet for said armature and the armature air gap, the enery stored in said cumulator spring by said loading thereof becoming effective to move said work performing member from its said first position when the air gap of said armature is reduced to a value approaching that which affords maximum magnetic attraction of said electromagnet for said armature.

5. In apparatus of the class described, in combination, a power unit for energization from a source of electric energy, an armature arm having a retracted position, said power unit, when energized, exerting magnetic attraction for actuating said armature arm toward attracted position, a work performing arm, a common pivot for said armature arm and said work performing arm, a cumulator spring operatively associated with said work performing arm, and a link for transmitting movement of said armature arm toward attracted position to said spring for storing energy in said spring by movement of said armature arm toward attracted position, said spring being so associated with said work performing arm to shorten its effective length and thereby increase its stiffness as said armature arm moves from retracted position toward attracted position, the energy stored in said spring being effective following predetermined movement of said armature arm from its retracted position to cause said work performing arm to perform work.

6. Apparatus according to claim 5 wherein there is adjustable means for loading said cumulator spring independently of the force exerted thereon by actuation of said armature.

7. Apparatus according to claim 5 wherein there is a resilient contact arm operatively associated with said work performing arm for actuation from one position to another position by the reaction of said cumulator spring.

8. Apparatus according to claim 5 wherein there is adjustment means for bringing said armature arm into position so that the curve representing the spring rate of said spring lies below the curve representing the relationship between the magnetic attraction of said power unit and the armature air gap.

9. Apparatus according to claim 5 wherein there is a resilient contact arm operatively associated with said work performing arm for actuation from a first position to a second position by the reaction of said cumulator spring, and snap means for providing high pressure of said contact arm in its said first position.

10. Apparatus of the class described, in combination, a power unit for energization from a source of electric energy, an armature having a retracted position, said power unit, when energized, exerting magnetic attraction for actuating said armature to an attracted position, said magnetic attraction increasing in magnitude as said armature approaches said attracted position, a work performing member, an energy storing force transmitting connection between said armature and member comprising a cumulator spring, said connection being operable to store energy in said spring by predetermined movement of said armature toward attracted position and to expend the stored energy in said spring following such predetermined movement of said armature to cause said member to perform work, and means operatively associated with said spring for increasing the spring rate thereof in substantial accordance with the increase in magnetic attraction exerted on said armature by said power unit as said armature moves from retracted position toward attracted position.

11. Apparatus of the class described, in combination, a power unit for energization from a source of electric energy, an armature having a retracted position, said power unit, when energized, exerting magnetic attraction for actuating said armature to an attracted position, a work performing member, an energy storing force transmitting connection between said armature and member comprising a cumulator spring, said connection being operable to store energy in said spring by predetermined movement of said armature toward attracted position and to expend the stored energy in said spring following such predetermined movement of said armature to cause said member to perform work, said operator having means operatively associated with said spring for increasing the spring rate thereof as said armature moves from retracted position toward attracted position, and adjustable means for loading said cumulator spring independently of the force exerted thereon by actuation of said armature.

12. Apparatus of the class described, in combination, a power unit for energization from a source of electric energy, an armature having a retracted position, said power unit, when energized, exerting magnetic attraction for actuating said armature to an attracted position, said magnetic attraction increasing in magnitude as said armature approaches said attracted position, a work performing member, an energy storing force transmitting connection between said armature and member comprising a cumulator spring, said connection being operable to store energy in said spring by predetermined movement of said armature toward attracted position and to expend the stored energy in said spring following such predetermined movement of said armature to cause said member to perform work, means operatively associated with said spring for increasing the spring rate thereof in substantial accordance with the increase in magnetic attraction exerted on said armature by said power unit as said armature moves from retracted position toward attracted position, and adjustment means operatively associated with said work performing member for positioning the latter so that the curve representing the spring rate of said spring lies below the curve representing the relationship between the magnetic attraction of said power unit and the armature air gap.

13. In apparatus of the class described, in combination, a power unit for energization from a source of electric energy, an armature having a retracted position separated from said unit by an air gap, said power unit, when energized, exerting magnetic attraction for actuating said armature from a retracted position to attracted position, a work performing member, and energy storing force transmitting connection means operatively interposed between said armature and said member for storing energy therein during predetermined movement of said armature from its retracted position toward its attracted position, said armature being incapable of causing said member to perform work during said predetermined armature movement, said energy storing means having, under the energy storing action of said armature, an energy storing rate which substantially follows the relationship between the magnetic attraction of said power unit for said armature and the armature air gap, movement of said armature toward its attracted position following said predetermined movement affording sufficient energy when combined with the energy stored in said spring to cause said member to perform work.

14. In apparatus of the class described, in combination, a power unit for energization from a source of electric energy, an armature having a retracted position separated from said unit by an air gap, said power unit, when energized, exerting magnetic attraction for actuating said armature from a retracted position to attracted position, a work performing member biased to a first position corresponding to the retracted position of said armature and being movable to a second position corresponding to the attracted position of said armature, and energy storing force transmitting connection means operatively interposed between said armature and said member for storing energy therein during predetermined movement of said armature from its retracted position toward its attracted position, said armature being incapable of causing said member to perform work during said predetermined armature movement, said energy storing means having, under the energy storing action of said armature, an energy storing rate which substantially follows the relationship between the magnetic attraction of said power unit for said armature and the armature air gap, movement of said armature toward its attracted position following said predetermined movement affording sufficient energy when combined with the energy stored in said spring to cause said member to be moved from its first to its second position.

15. In combination, a movable member biased to a first extreme position and being movable to a second extreme position, an electromagnetic operator having an actuator for moving said movable member and having a power unit operable when energized to move said actuator from a first extreme position corresponding to the first extreme position of said movable member to a second extreme position corresponding to the second extreme position of said movable member, the actuating force exerted by said power unit on said actuator being relatively small when said actuator is in its first extreme position and increasing substantially as said actuator approaches its second extreme position, and means for effecting movement of said movable member from said first extreme position to its said second extreme position in response to energization of said power unit by a current of smaller magnitude than that required by said unit to produce an initial actuating force on said actuator sufficient to overcome the biasing force on said movable member, comprising an energy storing force transmitting connection between said actuator and movable member including an energy storing leaf spring operable to store energy therein during initial movement of said actuator, and cam means coacting with said leaf spring for increasing the spring rate thereof in substantial accordance with the increase in actuating force exerted by said power unit on said actuator as the latter is moved thereby away from its first extreme position, movement of said actuator to a predetermined position intermediate its said first and second extreme positions affording an actuating force on the actuator sufficient to overcome the biasing force on said movable member to move the latter away from its first extreme position, movement of said actuator from said predetermined position to its second extreme position affording sufficient energy when combined with the energy stored in said spring to move said movable member from its first to its second extreme position, the increase in said spring rate affording substantially increased utilization of the work available from said power unit.

16. In combination, a movable member biased to a first position and being movable to a second position, an operator having an actuator for moving said movable member and having a power unit operable when energized to move said actuator from a first position corresponding to the first position of said movable member to a second position corresponding to the second position of said movable member, the actuating force exerted by said power unit on said actuator being relatively small when said actuator is in its first position and increasing substantially as said actuator approaches its second position, and means for effecting movement of said movable member from its first position to its second position in response to energization of said power unit by a current of smaller magnitude than that required by said unit to produce an initial actuating force on said actuator sufficient to overcome the biasing force on said movable member, comprising an energy storing force transmitting connection between said actuator and movable member including an energy storing spring operable to store energy therein during initial movement of said actuator, and means coacting with said connection for increasing the spring rate of said spring in substantial accordance with the increase in actuating force exerted by said power unit on said actuator as the latter is moved thereby away from its first position, movement of said actuator to a predetermined position intermediate its said first and second positions affording an actuating force on the actuator sufficient to overcome the biasing force on said movable member to move the latter away from its first position, movement of said actuator from said predetermined position to its second position affording sufficient energy when combined with the energy stored in said spring to move said movable member from its first to its second position, the increase in said spring rate affording substantially increased utilization of the work available from said power unit.

References Cited in the file of this patent

UNITED STATES PATENTS

| | | |
|---|---|---|
| 1,576,768 | Loudon | Mar. 16, 1926 |
| 1,700,041 | Grob | Jan. 22, 1929 |
| 1,753,726 | Sosinski | Apr. 8, 1930 |
| 2,172,678 | Heftler | Sept. 12, 1939 |
| 2,316,170 | Kesselring | Apr. 13, 1943 |
| 2,349,443 | McCarty | May 23, 1944 |
| 2,506,234 | Neild | May 2, 1950 |
| 2,596,409 | Johnson | May 13, 1952 |